April 7, 1964

C. R. HOOD ETAL 3,128,215

METHOD AND APPARATUS FOR SEALING A THERMOPLASTIC
TOP TO A TUBULAR BODY

Filed July 13, 1961

INVENTORS
CHARLES R. HOOD
JEAN E. SCHAEFER
BY
Fredrick H. Brown
ATTORNEY

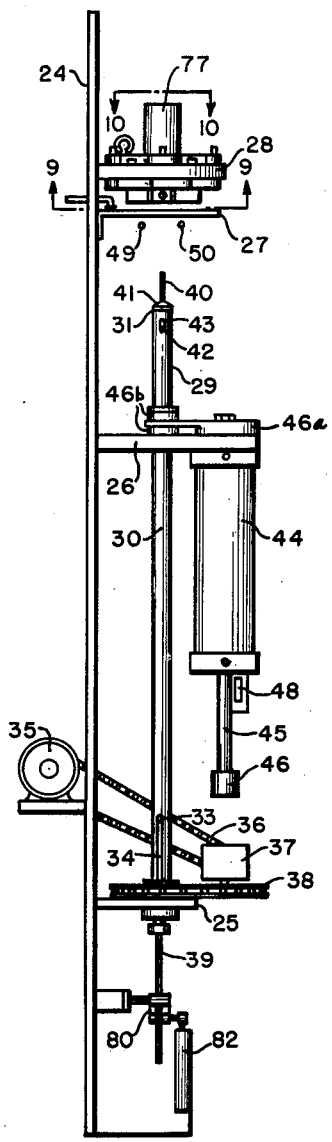
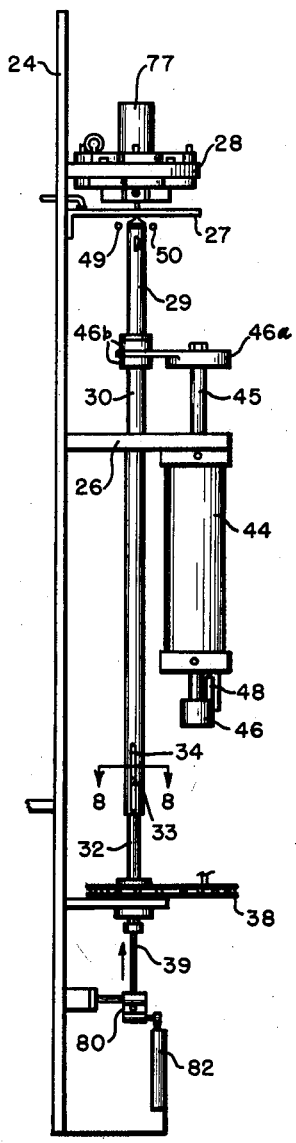
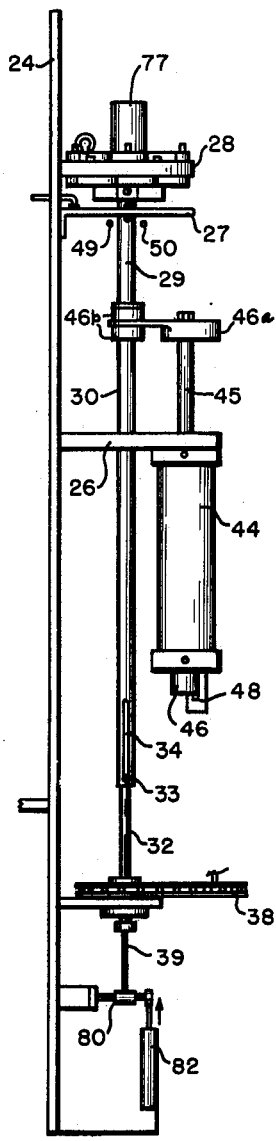
FIG.5   FIG.6   FIG.7
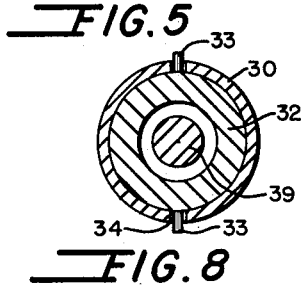
FIG.8
INVENTORS
CHARLES R. HOOD
BY    JEAN E. SCHAEFER
Fredrick H. Brown
ATTORNEY April 7, 1964 C. R. HOOD ETAL 3,128,215
METHOD AND APPARATUS FOR SEALING A THERMOPLASTIC
TOP TO A TUBULAR BODY
Filed July 13, 1961 4 Sheets-Sheet 3

INVENTORS
CHARLES R. HOOD
BY JEAN E. SCHAEFER
Fredrick H. Braun
ATTORNEY

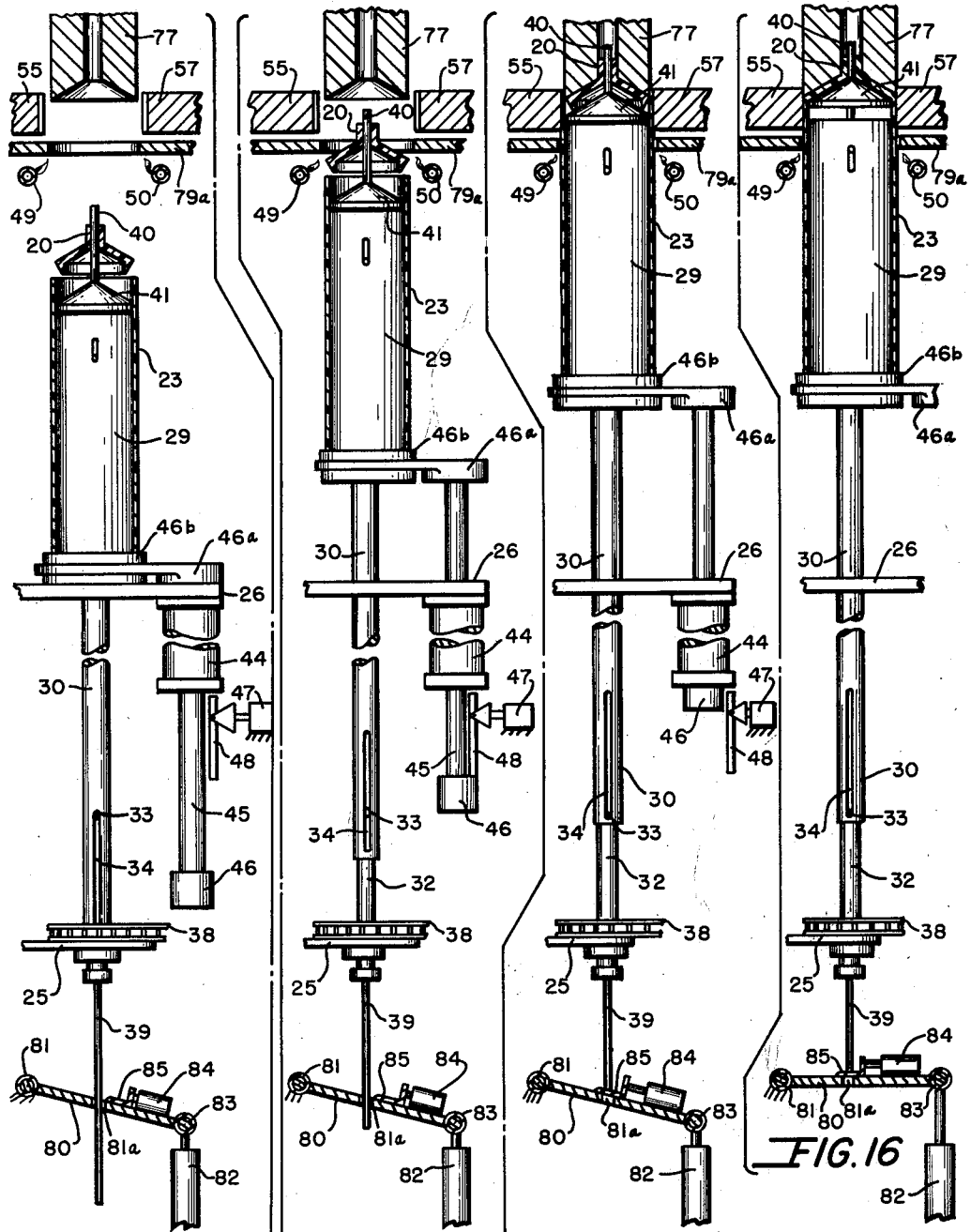

United States Patent Office 3,128,215
Patented Apr. 7, 1964

3,128,215
METHOD AND APPARATUS FOR SEALING A THERMOPLASTIC TOP TO A TUBULAR BODY
Charles R. Hood, Springfield Township, Hamilton County, and Jean E. Schaefer, Colerain Township, Hamilton County, Ohio, assignors to The Procter & Gamble Company, Cincinnati, Ohio, a corporation of Ohio
Filed July 13, 1961, Ser. No. 123,862
11 Claims. (Cl. 156—69)

This invention relates to an apparatus and method for flame sealing a molded thermoplastic top to a tubular body thereby forming a collapsible tube. More particularly, the invention contemplates holding a premolded top and a tubular body in spaced relationship while applying heat to the areas to be sealed, telescoping the sealing portions, and restraining the exterior surfaces of the top and body while applying internal pressure to seal and complete the assembly.

The present invention has as its principal object the provision of a method and apparatus in which a molded top for a collapsible tube can be welded or seamed to the end of a tubular body. This permits the use of plastic laminated foil materials for the tubular body which are resistant to the usual loss of moisture, flavor and aroma occurring in collapsible tubes that are fabricated entirely from plastic materials. In addition, the plastic laminated metal foil body of the tube may be decorated prior to assembly with the top thus eliminating another unnecessary and costly step in the usual collapsible tube making process. The construction thus achieved has still another advantage in that there are no exposed metallic surfaces which can be chemically attacked by the product to be packaged therein.

Another object of this invention is the provision of an apparatus and method for assembling collapsible tubes from a molded top and a length of tubing thus permitting a wide choice of materials and combinations of materials to suit specific requirements of product protection, package use and variations in package dress.

Still another object of the invention is the provision of an apparatus and method in which the top and body of the tube are seamed together at high speeds with a joint that is barely noticeable and does not detract from the appearance of the finished package.

A further object of the invention is the provision of an apparatus and method for fabricating collapsible tubes which does not require exacting dimensional tolerances of the tube components in order to be successfully used or practiced.

Briefly state, in accordance with one aspect of the invention, a molded top for a collapsible tube and a plastic laminated metal foil tubular body for same are held in slightly spaced relationship; selected surfaces of the components are heated sufficiently so that the areas to be sealed or seamed together are in sealable condition; the top and body are then telescoped; the outer periphery of the body and the shoulder portion of the top are then restrained; the depending skirt portion of the top which projects into the upper portion of the body is pressed outwardly against the inner periphery of the upper body portion; the body and top are held in this position until the heated and softened areas have solidified to form a finished collapsible tube.

While the specification concludes with claims particularly point out and distinctly claiming the subject matter regarded as forming the present invention, it is believed the invention will be better understood from the following description taken in connection with the accompanying drawings in which:

FIGURE 5 is a side elevation of the apparatus with the mandrel in its lowermost position;

FIGURE 6 is a side elevation of the apparatus in posion where the flame plays against the top and upper portion of the body;

FIGURE 7 is a side elevation of the apparatus in the position when the top and upper portion of the body are held in the chuck;

FIGURE 8 is an enlarged section on the line 8—8 of FIGURE 6 showing the concentric shaft arrangement;

FIGURE 13 is a schematic view, partially in cross section, of the apparatus with the body and the top of the tube in their initial position;

FIGURE 14 is a schematic view, partially in cross section, of the apparatus in the position where the burner heads heat the top and upper portion of the tube body;

FIGURE 15 is a schematic view, partially in cross section, showing the position of the parts when top is against the anvil and the upper portion of the body is held by the chuck jaws; and FIGURE 16 is a schematic elevation, partially in cross section, showing the position of the parts when the tube is completed.

Figure 2:
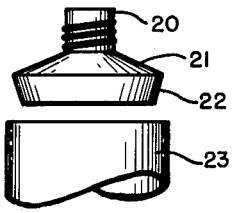
FIGURE 2 is an exploded fragmentary elevation showing the molded top and a portion of the tubing before being molded together.
Figure 3:
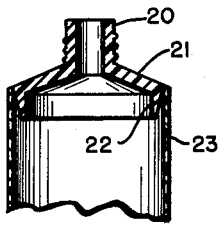
FIGURE 3 is a fragmentary longitudinal section, showing the top and body of the tube in proper position prior to being welded together.
Figure 4:
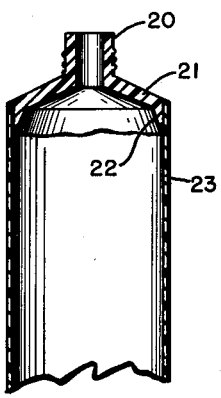
FIGURE 4 is a fragmentary longitudinal section, showing the finished collapsible tube.
Figure 9:
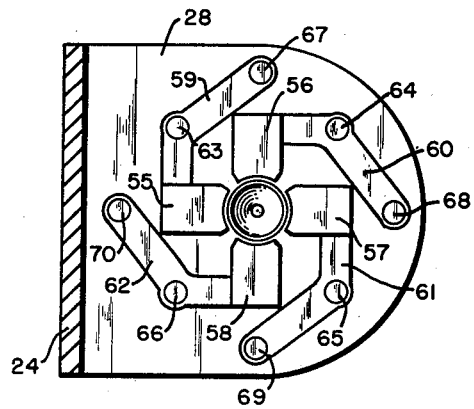
FIGURE 9 is a bottom view on the line 9—9 of FIGURE 5 showing the chuck jaws.
Figure 10:
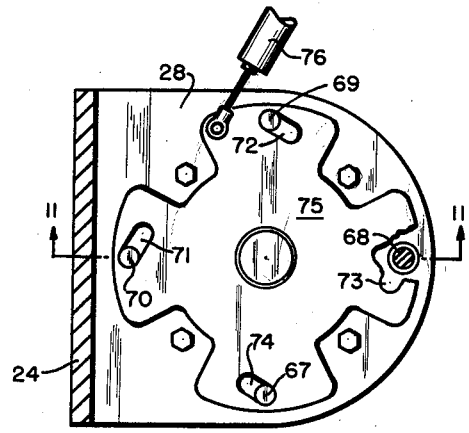
FIGURE 10 is a plan view of the chuck plate which actuates the jaws of FIGURE 9; the view is taken on the line 10—10 of FIGURE 5.
Figure 11:
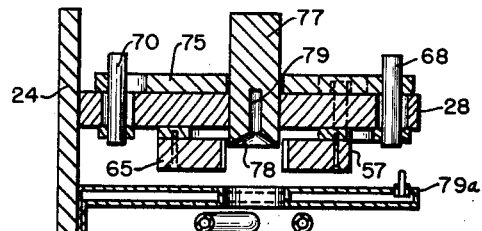
FIGURE 11 is a fragmentary section of the chuck taken on the line 11—11 of FIGURE 10.

Referring first to FIGURES 2, 3 and 4, the product manufactured by the apparatus and method is shown. The components of the collapsible tube comprise a molded top 20 having a shoulder 21 and an inturned depending skirt 22, and a tubular body 23. The top can be molded from any commercially available thermoplastic material such as polyethylene or the like. The body 23 can be fabricated from sheet stock by the apparatus and method and from the materials described in the copending commonly owned application of Charles R. Hood et al., Serial No. 123,837, filed July 13, 1961, entitled Apparatus and Method of Forming Tubing From a Continuous Web.

The apparatus and method for fabricating the collapsible tube will now be described with reference to FIGURES 1 and 5. The apparatus is composed of a frame 24 having mounting brackets 25, 26, 27 and 28 extending therefrom. The hollow shaft 30 terminates in a body mandrel 29 which extends upwardly from the shaft 30 and has its upper end at 31. As seen in FIGURES 6 and 8, the shaft 30 is telescopically mounted over an internal hollow shaft 32. The two shafts are maintained in driving engagement by the pins 33 projecting radially from shaft 32. The pins 33 engage the slots 34 formed in shaft 30. The shaft 32 is driven by the motor 35, the chain 36, the gear box 37 and the chain 38 which runs over a sprocket attached to the shaft 32. A central shaft 39 extends up through the shafts 30 and 32 as well as the body mandrel 29 and terminates in a tip 40. The shoulder member 41 is shaped to conform substantially with the inside of the shoulder 21 of the top 20 and is attached to the central shaft 39 near the tip 40. The central shaft 39 is independently movable lengthwise within the shafts 30 and 32, travel being limited by the pin 42 which is movable in the slot 43. A direct rotative drive from the body mandrel 29 to the central shaft 39 is provided by the pin 42.

Figure 12:
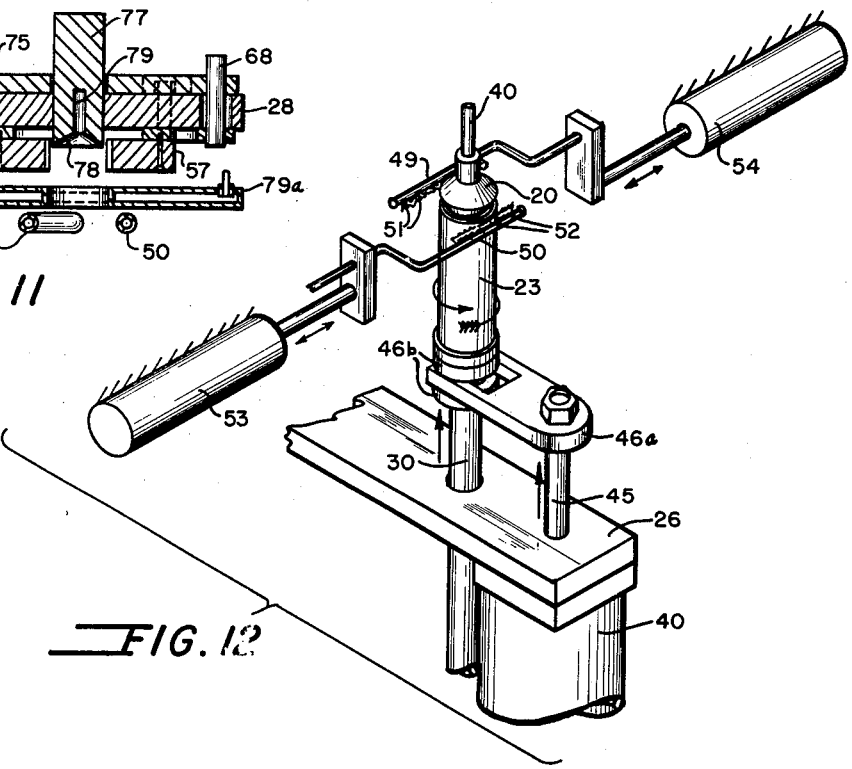
FIGURE 12 is a perspective view showing the burners in position heating the top and body of the tube portions.

An air cylinder 44 is attached to the mounting bracket 26 at one end and has a piston rod 45 extending downwardly with a collar 46 attached near its end. As shown in FIGURE 12, a clevis 46a is attached to the other end of the piston rod 45. The clevis 46a is interposed between the thrust bearing supports 46b attached to the shaft 30 so that the cylinder 44 can move the shafts 30 and 39 upwardly and downwardly. A normally deenergized solenoid 47 having a stop 48 is mounted on a suitable bracket so that the stop 48 is in the path of the collar 46 when the latter is moved upwardly.

Figure 1:
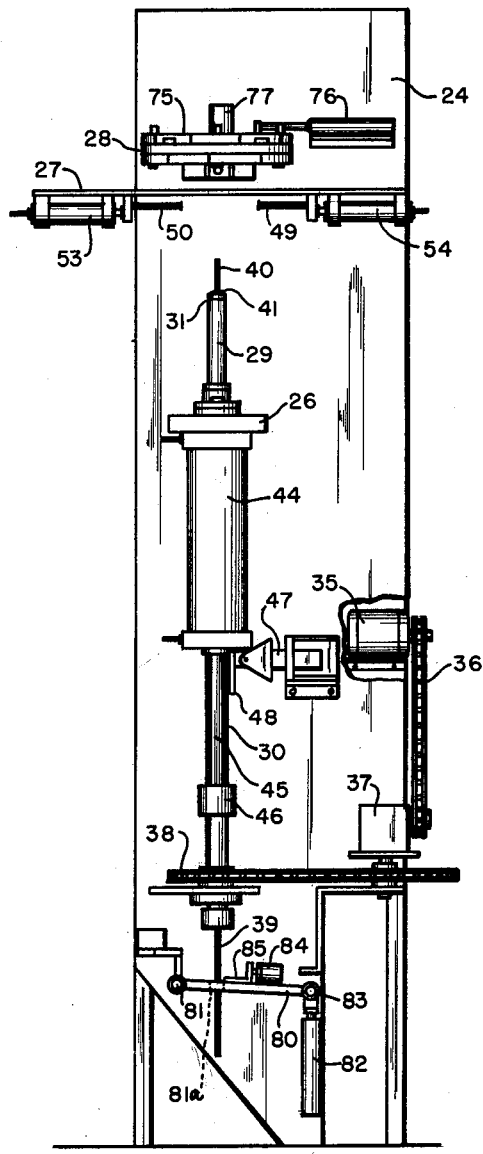
FIGURE 1 is a front elevation, partially broken away, of apparatus for use in the fabrication of collapsible tubes.

Referring now to FIGURES 1 and 12, a pair of burner heads 49 and 50 are shown suspended from the mounting bracket 27. The burner heads have openings at 51 and 52 through which a combustible gas is fed to produce a flame which is directed toward the apparatus as shown in FIGURE 12. The air cylinders 53 and 54 attached to the underside of the bracket 27 are used to move the burner heads 49 and 50 into the position shown in FIGURE 12 to heat and soften to adhesiveness the surfaces on the top 20 and the upper portion of the body 23 which are to be adhered together to form the finished tube. When not in use, the burner heads 49 and 50 can be withdrawn by the air cylinders 53 and 54 when this phase of the cycle is completed.

FIGURES 9, 10, 11, and 13 illustrate a chuck which is attached to the mounting bracket 28 and will now be described in greater detail. The chuck is composed of jaws 55, 56, 57 and 58 actuated by levers 59, 60, 61 and 62. The aforesaid levers are pivoted at 63, 64, 65 and 66 and their ends have pins 67, 68, 69 and 70 which extend upwardly through the bracket 28 into the slots 71, 72, 73 and 74 of the rotatable plate 75. An air cylinder 76 secured to the frame of the machine has its end attached to the plate 75 so that when the plate is rotated, the slots 71, 72, 73 and 74 acting on the pins 67, 68, 69 and 70 will either open or close the jaws 55, 56, 57 and 58 depending on the direction of rotation of the plate 75. An anvil 77 is mounted centrally on the mounting bracket 28. The lower portion of the anvil 77 is drilled out to form an opening having a tapered portion as at 78 which conforms to the shoulder surface 21 of the top 20 and an opening 79 to give clearance to the threaded portion of the top. A heat shield 79a is interposed between the chuck and the burners 49 and 50 in order to deflect the rising heat from the burners.

Going back now to FIGURES 1 and 13, there is shown a lever 80 which is pivoted to the frame 24 at 81. The lever has an opening 81a through which the shaft 39 passes. An air cylinder 82 is secured to the frame of the machine and has the end of its piston rod attached at 83 to the lever 80. A spring loaded solenoid 84 is attached to the lever 80 and has a latch portion 85 which is normally to the right as seen in FIGURE 1 when the solenoid is energized.

In operation, the apparatus is initially in the position shown in FIGURES 1, 5 and 13. A tubular body 23 is slipped over the mandrel 29 as shown in FIGURE 13. The small opening in the molded top 20 frictionally engages the tip 40 and is slipped downwardly until it is spaced from the body 23 in the approximate relationship also shown in FIGURE 13. It will be noted that the top is in slightly spaced relationship with respect to the body 23 to leave the skirt 22 exposed as also shown in FIGURE 2. The top 20 and body 23 are in axial alignment when so held although this is not a necessity for the successful practice of the invention. The motor 35 is started and the top 20 and body 23 are rotated at substantially constant speed. Next, the air cylinder 44 is actuated to a first position where it is stopped by the collar 46 which engages the stop 48 as shown in FIGURES 6 and 14.

The air cylinders 53 and 54 are then actuated so that the burner heads 49 and 50 are moved into position as shown in FIGURE 12. The heat from the burner heads is directed at the skirt portion 22 of the top 20 and at the upper portion of the body 23 while both are rotating. These portions are heated until the skirt portion 22 softens to plastic adhesive consistency at which point the air cylinders 53 and 54 are again actuated and the burners withdrawn.

The solenoid 47 is then energized withdrawing the stop 48 from the collar 46 and permitting the air cylinder 44 to move the entire assembly upwardly to the position shown in FIGURES 7 and 15. As it moves to this position, the shoulder 21 of the top 20 bears against the tapered opening 78 in the bottom portion of the anvil 77 to hold the top 20 against movement. Continued upward movement of the body 23 effects telescoping of the body and the skirt 22 of the top (see FIGURES 3 and 15). The air cylinder 76 is then actuated closing the jaws 55, 56, 57 and 58 around the upper portion of the body 23.

After the parts come into this position, shown in FIGURE 3, the solenoid 84 is deenergized allowing the spring to move the latch 85 across the opening 81a in the lever 80 and beneath the end of the central shaft 39. The air cylinder 82 is then actuated moving the shaft 39 as well as the tip 40 and shoulder 41 upwardly to a position seen in FIGURE 16. This last operation forces the molten skirt portion 22 outwardly against the inner surface of the upper portion of the body 23 while the outer surfaces of the top 20 and body 23 are restrained by the anvil 77 and the chuck jaws 55, 56, 57 and 58, respectively. The parts are held in this position momentarily until the thermoplastic material of the top and of the coating in the body adhere and solidify. The operation is thus completed and a collapsible tube as illustrated in FIGURE 4 is fabricated. The parts of the apparatus are then returned to their initial operating position where the finished collapsible tube can be removed and the cycle started over again.

The circuitry and the pneumatic system for operating the various solenoids and air cylinders are conventional and are not described in any detail herein. It will be obvious to the skilled worker that various forms of mechanical, pneumatic, hydraulic or electrical actuating devices may be employed for the various operating components of the device and that the actuating or operating circuits for these components will vary accordingly. However, with these teachings as a guide, the necessary circuit means for carrying out the objectives of the invention will be readily apparent to the skilled worker in the art.

While particular embodiments of the invention have been illustrated and described, it will be obvious to those skilled in the art that various changes and modifications can be made without departing from the spirit and scope of the invention and it is intended to cover in the appended claims all such changes and modifications that are within the spirit and scope of this invention.

What is claimed as new is:

1. In the process of sealing a premolded thermoplastic top having a depending skirt portion to a preformed thermoplastic coated tubular body, the steps which comprise positioning said body and top in axial alignment and slightly axially spaced relationship, rotating both body and top while simultaneously heating selected surfaces of each until said skirt portion is softened to plastic adhesive consistency, said selected surfaces comprising portions of said body and top which are to be sealed together, thereafter effecting relative axial displacement of said body and top to place them in substantially the same relative position desired in the finished article wherein the depending skirt portion of the top is telescoped with the adjacent end of the body, and applying internal pressure to the inner skirt portion of the top so that it contacts the inside surface of the upper end of the body while concurrently embracing the exterior periphery of the telescoped top and body until the said selected surfaces adhere and solidify thereby to complete a seal between the telescoped portions of the body and top.

2. A method of making collapsible tubes from a thermoplastic top having a depending skirt portion and a laminated tubular body comprising the steps of supporting the top and body and spaced relationship, simultaneously rotating said top and said body, heating the top and body in the area to be sealed until said skirt portion is softened to plastic adhesive consistency, moving the top and the body relatively in an axial direction to telescope said skirt portion within the upper portion of the body, forcing the adhesively softened skirt portion outwardly against the inside surface of the upper portion of the body while concurrently embracing the telescoped top and body until the area to be sealed adheres and solidifies.

3. Apparatus for sealing a premolded thermoplastic top having a depending skirt portion to a preformed laminated tubular body comprising means for holding said body and top in spaced apart relationship, means for rotating both body and top simultaneously heating selected surfaces of each, said selected surfaces including the portions of said body and top which are to be sealed together, means for telescoping said body and top in substantially the same relative position desired in the finished article with the depending skirt portion of the top within the body, means for pressure to the said depending skirt portion to thereby deform the depending skirt portion of the top and bring said selected heated surfaces into contact, and means for embracing the exterior periphery of the telescoped top and body until the said selected surfaces adhere and solidify.

4. Apparatus for sealing a thermoplastic top having a depending skirt portion to a laminated tubular body comprising means for supporting the body, means for supporting the top in axial alignment with the body but spaced therefrom, means for rotating said top and said body, means for heating the top and body in the areas to be sealed, means for telescoping the top and the body into proper relative relationship with the skirt portion within the upper portion of the body, means for forcing the skirt portion outwardly against the inside surface of the upper portion of the body, and means for concurrently embracing the exterior periphery of the telescoped top and body until the areas to be sealed are adhered and solidified.

5. Apparatus as claimed in claim 4 wherein the means for supporting the body comprises a mandrel and the means for supporting the top includes a shoulder and tip secured to a shaft slidable axially inside the mandrel.

6. Apparatus as claimed in claim 4 wherein the heating means includes at least one burner head and means for moving the burner head into position to heat the areas to be sealed.

7. Apparatus as claimed in claim 5 wherein the heating means includes at least one burner head and means for moving the burner head into position to heat the areas to be sealed.

8. Apparatus for sealing a thermoplastic top having a depending skirt portion to a laminated tubular body comprising means for supporting the body, means for supporting the top in axial alignment with the body but spaced therefrom, means for simultaneously rotating said top and said body, means for heating the top and body in the areas to be sealed, means for moving the top and body axially into proper relative relationship with the skirt portion telescoped within the upper portion of the body, means for forcing the skirt portion outwardly against the inside surface of the upper portion of the body and means for embracing the exterior periphery of the telescoped top and body until the areas to be sealed are adhered and solidified.

9. Apparatus as claimed in claim 8 wherein the means for supporting the body comprises a mandrel and the means for supporting the top includes a shoulder and tip secured to a shaft slidable axially inside the mandrel.

10. Apparatus as claimed and claim 8 wherein the means for embracing the top and body around their exterior periphery include a chuck having a plurality of jaws and a stationary anvil.

11. Apparatus as claimed in claim 9 wherein the means for embracing the top and body around their exterior periphery include a chuck having a plurality of jaws and a stationary anvil.

References Cited in the file of this patent

UNITED STATES PATENTS

| | | |
|---|---|---|
| 1,678,330 | Clyne | July 24, 1928 |
| 2,383,230 | Voke | Aug. 21, 1945 |
| 2,760,551 | Downey et al. | Aug. 28, 1956 |
| 3,052,926 | Quinche et al. | Sept. 11, 1962 |

FOREIGN PATENTS

| | | |
|---|---|---|
| 575,233 | Canada | May 5, 1959 |

UNITED STATES PATENT OFFICE
CERTIFICATE OF CORRECTION

Patent No. 3,128,215

April 7, 1964

Charles R. Hood et al.

It is hereby certified that error appears in the above numbered patent requiring correction and that the said Letters Patent should read as corrected below.

Column 1, line 51, for "state" read -- stated --; column 5, line 31, after "for" insert -- applying internal --.

Signed and sealed this 4th day of August 1964.

(SEAL)
Attest:

ERNEST W. SWIDER
Attesting Officer

EDWARD J. BRENNER
Commissioner of Patents